United States Patent [19]

Lang-Ree

[11] 4,295,418

[45] Oct. 20, 1981

[54] CHAIN BROILER DOCTOR BLADE

[75] Inventor: Nils Lang-Ree, Los Altos, Calif.

[73] Assignee: NPI Corporation, Burlingame, Calif.

[21] Appl. No.: 151,325

[22] Filed: May 19, 1980

[51] Int. Cl.$^3$ .............................................. A47J 37/06
[52] U.S. Cl. ...................................... 99/355; 99/386; 198/635
[58] Field of Search ............ 99/386, 387, 355, 443 C, 99/404, 407; 126/41 F; 219/388; 426/389; 198/497, 499, 635, 637

[56] References Cited

U.S. PATENT DOCUMENTS

| 2,285,321 | 6/1942 | Zademach | 198/635 |
|---|---|---|---|
| 2,576,633 | 11/1951 | Naylor | 198/635 |
| 3,202,260 | 8/1965 | Wolf | 198/635 |
| 3,229,616 | 1/1966 | Reese | 99/386 |
| 4,151,791 | 5/1979 | Baker | 99/386 |
| 4,188,866 | 2/1980 | Baker | 99/386 X |

*Primary Examiner*—Billy J. Wilhite
*Attorney, Agent, or Firm*—Lothrop & West

[57] ABSTRACT

On the frame of a broiler having a chain conveyor with cross rods rounding some end sprockets, there are provided brackets affording transversely aligned, loose bearing notches open to the top. A doctor blade has transversely aligned intermediate shoulders operating in the bearing notches and has a depending skirt urged by gravity and serving as a counterweight to move the blade in the notches so as to urge the transverse upper edge of the doctor blade, and contact fingers extending therefrom, toward the chain conveyor cross rods and so to dislodge patties advancing on the chain conveyor.

2 Claims, 5 Drawing Figures

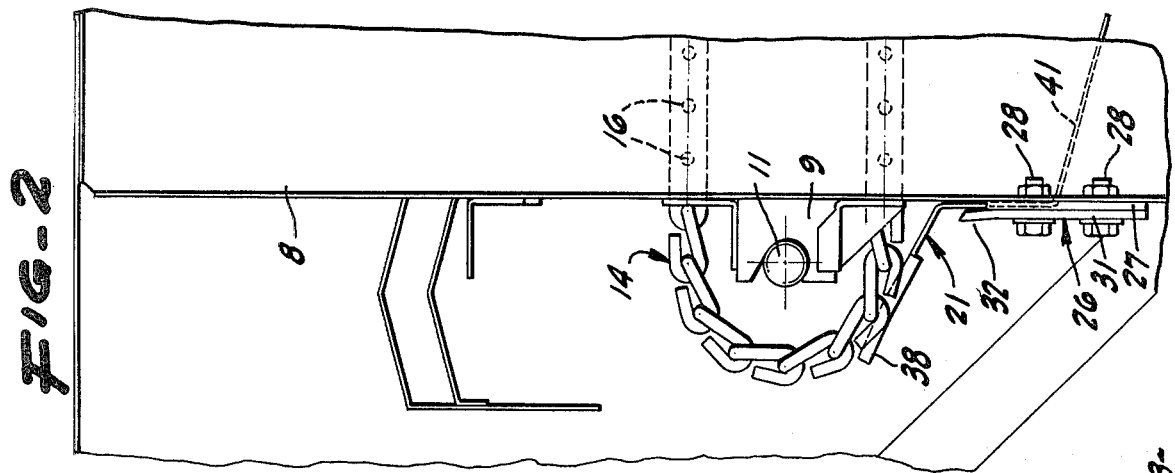
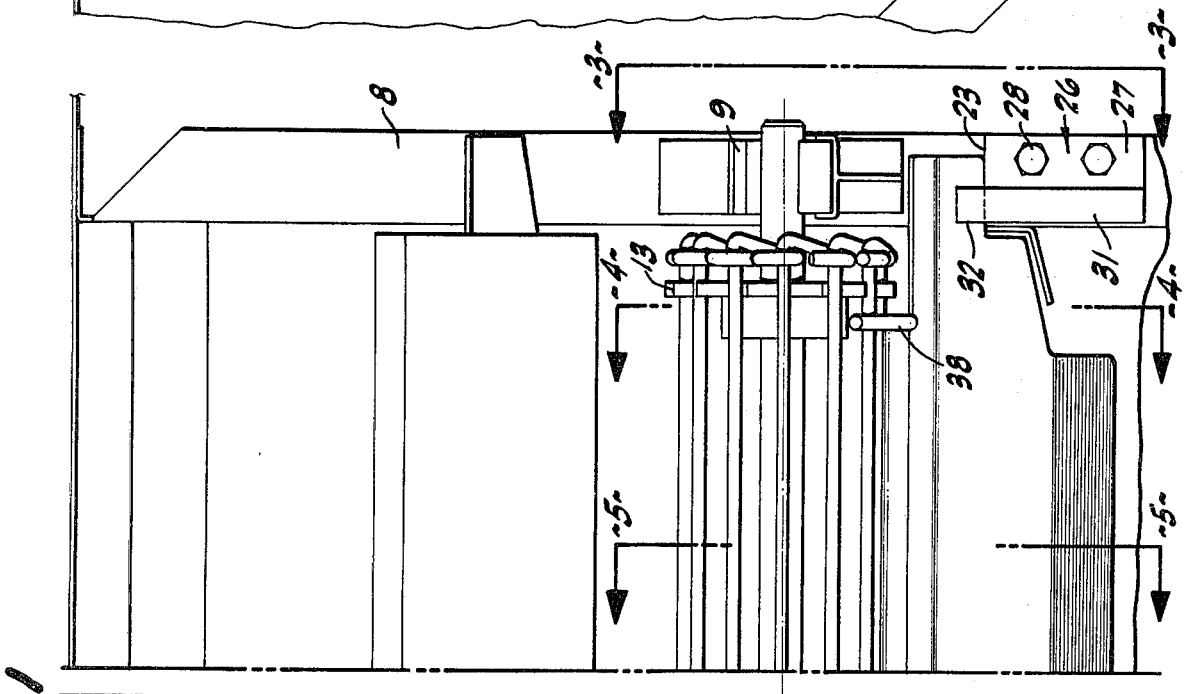

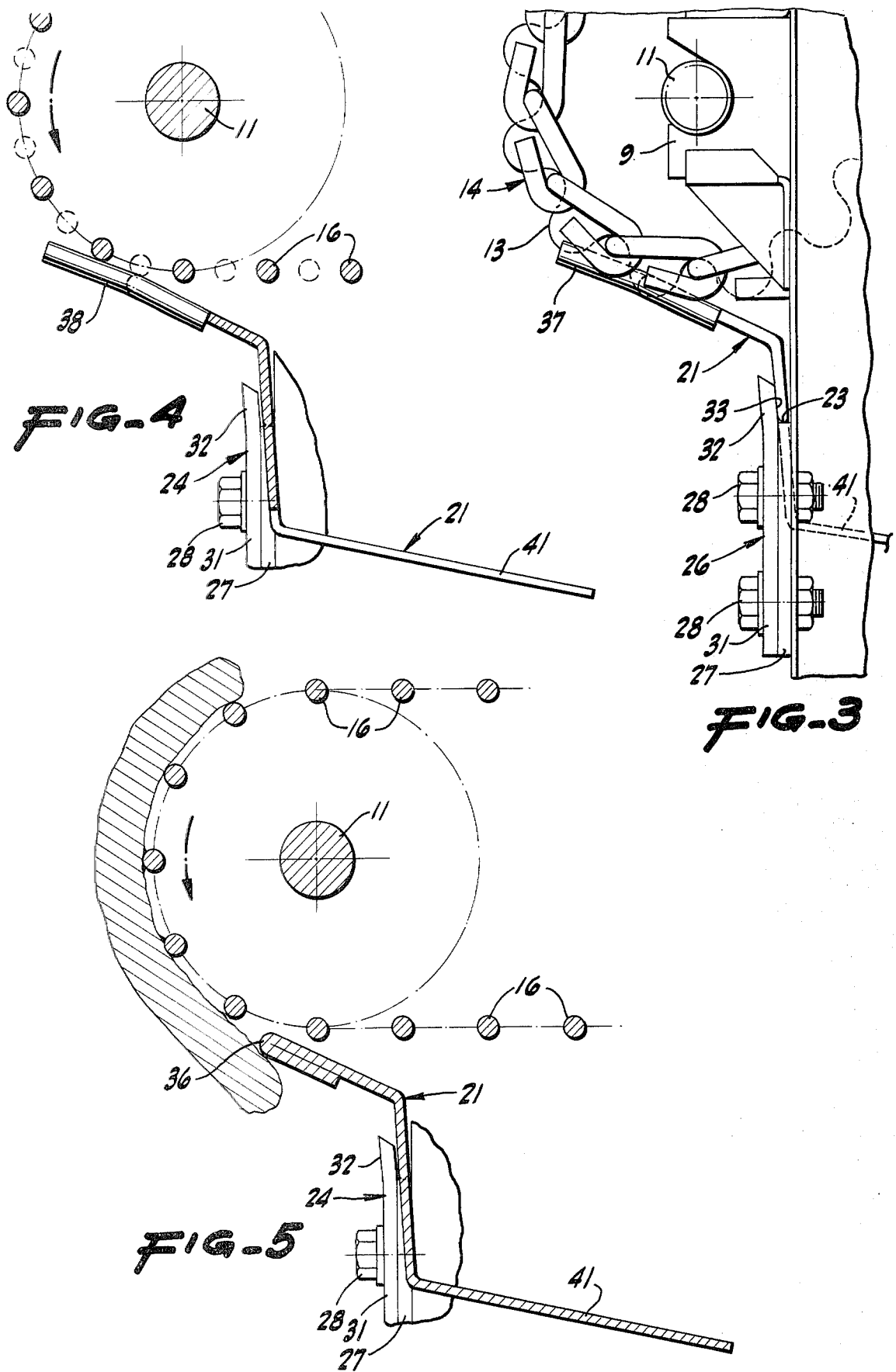

CHAIN BROILER DOCTOR BLADE

BRIEF SUMMARY OF THE INVENTION

A broiler has a chain conveyor with cross rods impelled to travel around sprockets. To cooperate with the cross rods in the under portion of the sprockets there is a transversely extending doctor blade having its upper, transverse edge in substantial contact with the cross rods and partly guided into that relationship by a pair of fingers projecting from the blade in the direction from which the rods come. The doctor blade at intermediate, transverse side edges fits loosely in slot bearings defined between uprights in the broiler frame and brackets adjustably and removably secured thereto. The doctor blade extends freely and substantially below the intermediate, side edges and so is impelled by gravity to urge the upper transverse edge yieldably toward the conveyor. The bearing brackets at the top preferably are bent away from the frame uprights to provide freely available slot bearings in which the intermediate edges can approximately pivot.

BRIEF DESCRIPTION OF THE SEVERAL VIEWS OF THE DRAWINGS

FIG. 1 is an end elevation of a portion of a chain broiler in which the doctor blade is installed, portions being broken away to reduce the size of the figure.

FIG. 2 is a side elevation of the structure shown in FIG. 1 with portions again being broken away to reduce the size of the figure.

FIG. 3 is a cross-section, the plane of which is indicated by the line 3—3 of FIG. 1.

FIG. 4 is another cross-section, the plane of which is indicated by the line 4—4 of FIG. 1.

FIG. 5 is a further cross-section, the plane of which is indicated by the line 5—5 of FIG. 1.

DETAILED DESCRIPTION

Machines for broiling patties such as hamburgers are well known, an example being shown in U.S. Pat. No. 4,188,866. Such machines include a frame on which cross shafts are mounted carrying pairs of sprockets around which end chains are trained. Conveyor rods extend transversely between the end chains or themselves form the chains and advance the patties in proximity with appropriate broiling elements so that the patties cook. As they round the conveyor discharge end near the sprockets, the cooked patties bend or deform and sometimes are difficult to dislodge from the conveyor cross rods. It is the particular purpose of this invention to provide a means such as a doctor blade for readily dislodging or releasing the cooked patties and for doing so in a very simple, direct and effective fashion.

In the particular arrangement disclosed herein, the machine frame has a pair of uprights 7 and 8 on which is mounted a pair of side bearings 9 receiving a conveyor shaft 11 appropriately driven. On that shaft there are sprockets 12 and 13 interengaged with a conveyor chain 14 inclusive of a plurality of cross rods 16. These follow a generally arcuate path as they travel around the sprockets 12 and 13 at the discharge end of the patty conveying path. One relationship of a cooked patty to the conveyor chain 14 is illustrated particularly in FIG. 5.

Particularly to be effective in dislodging the cooked patty from undue adhesion to the various cross rods, there is provided a doctor blade, generally designated 21. This is a transversely extending, formed plate at its opposite side edges having intermediate, indented bearing shoulders 22 and 23 in transverse alignment. Each of the shoulders 22 and 23 fits in an adjacent one of a pair of bearings 24 and 26. These bearings are inclusive of base plates 27 secured to the adjacent uprights 7 and 8 by removable fasteners 28. Each of the plates 27 is supplemented by a band 31 welded to the plate but at its upper end struck or deformed outwardly to provide a bearing wall 32. With the adjacent upright 7 or 8 and with the plate 27 acting as a spacer, there is provided a bearing slot 33 somewhat wider at the upper end than it is at the lower end.

Designed to span the frame of the machine and to be pivotally supported thereon are the bearing shoulders 22 and 23. The shoulders can rotate slightly in and have free bearing in the slots 33 so provided.

The doctor blade 21 is extended upwardly from the intermediate bearing shoulders 22 and 23 and is bent outwardly and rearwardly somewhat so as to have an upper edge 36 that can lie very close to or even against the rods 16 as they round the sprockets 12 and 13. To make sure that the exposed edge 36, formed by bending the plate back on itself, does not interfere with the rods, there are provided fingers 37 and 38 extending from the plate 21 and adapted to lie against the successively approaching transverse rods 16. Since the rods 16 are spaced, there is a little beneficial oscillation given to the doctor blade.

In order properly to impel the fingers and to maintain the doctor blade in its proper position, the plate 21 is extended inwardly and downwardly below the previously described portions thereof and certainly below the shoulders 22 and 23. The blade terminates in a counterweight portion 41, as particularly shown in FIGS. 4 and 5, the weight or mass of the counterweight portion acting about the shoulders 22 and 23 as fulcra. This is sufficient to urge the upper portion of the doctor blade into close juxtaposition with the rods 16. In this way the leading edge 36 is maintained in the path of any advancing patties and is always held in position, with some possible yielding, to make sure that the patties are removed from the rods and fall freely to a subsequent handling mechanism.

When, from time to time, the doctor blade needs adjustment, cleaning or replacement, it is readily removed by lifting the shoulders 22 and 23 from the slots near the walls 32. The doctor blade can be replaced by a similar unit or can be returned after servicing. While the intermediate shoulders of the doctor blade serve as excellent bearings, the angularity of the bearing walls 32 is such as to preclude excessive movement of the doctor blade. The counterweight effect of the doctor blade eliminates the necessity of springs or the like which might cause difficulty.

I claim:

1. A chain broiler doctor blade construction comprising a frame, a chain conveyor mounted on said frame to extend in a path having upper and lower portions connected by a semi-circular arcuate rear portion, means engaging said frame and defining supporting sockets on said frame at opposite sides of said chain conveyor, a doctor blade extending transversely of said chain conveyor near said arcuate rear portion thereof, means forming shoulders on said doctor blade near the central side portions of said blade and tiltably disposed in said sockets, and rods extending from said doctor blade and adapted to abut said arcuate rear portion of said chain conveyor.

2. A chain broiler doctor blade construction comprising a frame, a chain conveyor mounted on said frame to extend in a path having upper and lower portions connected by a semi-circular arcuate rear portion, means engaging said frame and defining supporting sockets on said frame at opposite sides of said chain conveyor, a doctor blade extending transversely of said chain conveyor near said arcuate rear portion thereof, means forming shoulders on said doctor blade near the central side portions of said blade and tiltably disposed in said sockets, said doctor blade including a sheet adapted to extend transversely of said frame, said sheet having one transverse edge adapted substantially to contact said chain conveyor, said sheet having a parallel other transverse edge adapted to swing freely, and said sheet having a pair of transversely aligned intermediate edges adapted to serve as supporting bearings and disposed in the side edges of said sheet closer to said one edge than to said other edge.

* * * * *